United States Patent [19]

Young

[11] Patent Number: 4,990,298

[45] Date of Patent: Feb. 5, 1991

[54] METHOD OF FORMING A WRAP AROUND HEAT SHRINKABLE CLOSURE WITH FLEXIBLE EXTENSION

[76] Inventor: Richard Young, 2401 Walsh Ave., Santa Clara, Calif. 94051

[21] Appl. No.: 213,687

[22] Filed: Apr. 18, 1988

Related U.S. Application Data

[62] Division of Ser. No. 880,129, Jun. 30, 1986, Pat. No. 4,738,883.

[51] Int. Cl.$^5$ ............................ B29C 55/02; B29C 61/02
[52] U.S. Cl. .................................. 264/291; 156/86; 264/342 R; 264/DIG. 71
[58] Field of Search ................. 428/36, 60, 40, 349, 428/353, 34.9, 35.1; 174/DIG. 8, 92; 138/110, 128, 156, 170–171; 156/86; 264/230, 291, 342 R, 293, DIG. 71

[56] References Cited

U.S. PATENT DOCUMENTS

| | | | |
|---|---|---|---|
| 3,412,891 | 11/1968 | Bastone | 428/36 |
| 3,826,702 | 7/1974 | Chapman | 156/86 |
| 3,847,721 | 11/1974 | Evans | 264/230 |
| 3,959,052 | 5/1976 | Stanek | 174/DIG. 8 |
| 3,973,064 | 8/1976 | Raine | 174/DIG. 8 |
| 4,153,747 | 5/1979 | Young | 174/DIG. 8 |
| 4,378,393 | 3/1983 | Smuckler | 156/86 |
| 4,521,420 | 6/1985 | Overbergh | 156/86 |
| 4,738,883 | 4/1988 | Young | 156/86 |

FOREIGN PATENT DOCUMENTS 0159722 12/1979 Japan ...................... 174/DIG. 8

*Primary Examiner*—Michael W. Ball
*Assistant Examiner*—Steven D. Maki

[57] ABSTRACT

A heat shrinkable closure is disclosed having a central section which has been hot stretched and cooled while in stretched condition sandwiched between a pair of unstretched end sections and in which one end section has a tapered grooved extension.

2 Claims, 2 Drawing Sheets

```
┌─────────────────────────────────────────┐
│ FORMING RECTANGULAR SHEET OF HEAT       │
│ SHRINKABLE POLYMER WITH UNIFORM THICKNESS│
└────────────────────┬────────────────────┘
                     │
┌────────────────────┴────────────────────┐
│ CLAMPING FIRST AND SECOND END SECTIONS, │
│ THE SECOND END BEING WIDER THAN THE FIRST│
└────────────────────┬────────────────────┘
                     │
┌────────────────────┴────────────────────┐
│ HEATING AND STRETCHING THE CENTRAL      │
│ REGIONS BETWEEN THE END SECTIONS        │
└────────────────────┬────────────────────┘
                     │
┌────────────────────┴────────────────────┐
│ COOLING THE STRETCHED CENTRAL REGION    │
└────────────────────┬────────────────────┘
                     │
          ┌──────────┴──────────┐
┌─────────┴────────┐  ┌─────────┴──────────────────┐
│ FORMING GROOVES IN│  │ FORMING GROOVES IN THE SECOND END│
│ THE SECOND END    │  │ SECTION BY HEAT DISPLACEMENT OF  │
│ SECTION           │  │ MATERIAL OF THE SECOND SECTION   │
└───────────────────┘  └──────────────────────────────────┘
```

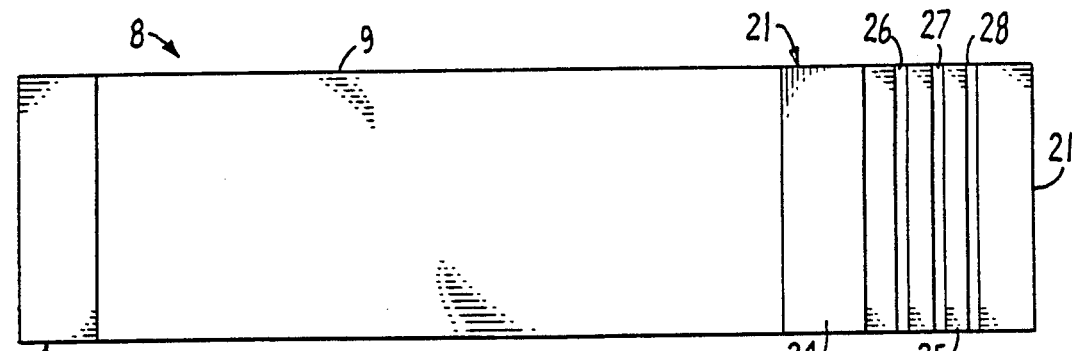
FIG. 1.
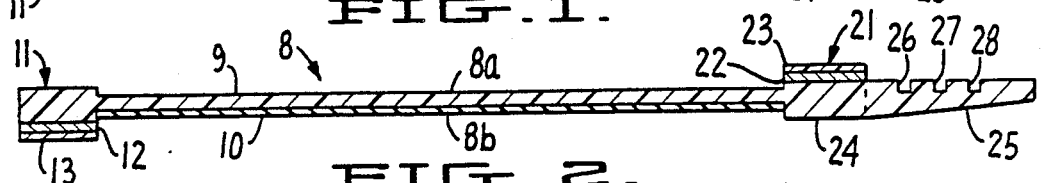
FIG. 2.
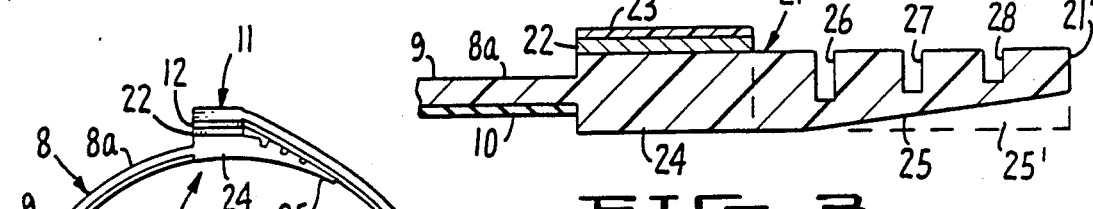
FIG. 3.
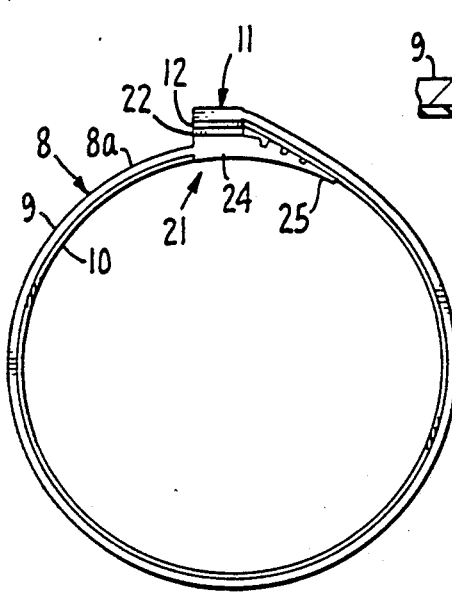
FIG. 4.
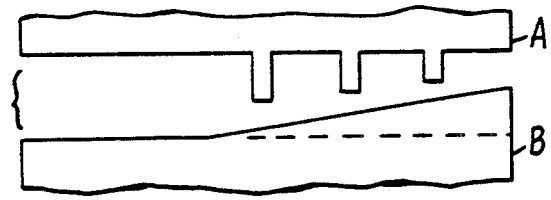
FIG. 6.
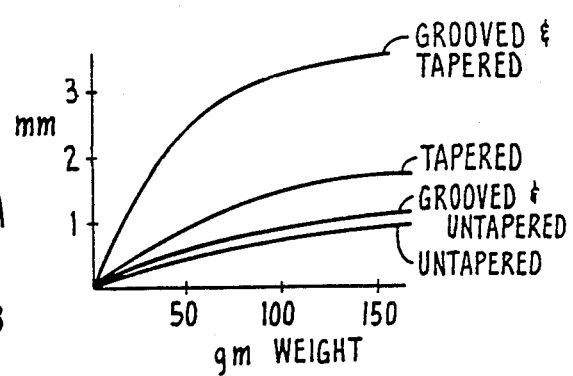
FIG. 5.
FIG. 7.

METHOD OF FORMING A WRAP AROUND HEAT SHRINKABLE CLOSURE WITH FLEXIBLE EXTENSION

This application is a division of U.S. application Ser. No. 880,129, filed June 30, 1986, which issued as U.S. Pat. No. 4,738,883 on Apr. 19, 1988.

BACKGROUND OF INVENTION

The present invention relates in general to wrap around heat shrinkable closures.

Wrap around heat shrinkable closures have been described and used in the past for covering and sealing articles of various shapes, typically tubular. A wrap around heat shrinkable closure is taught in U.S. Pat. No. 4,153,747, the disclosure of which is incorporated herein. The closure described in that patent comprises a generally rectangular sheet of heat shrinkable polymer having a large central section which has been hot stretched and cooled while in stretched condition and two small, flat, unstretched end sections integral with the central section. One end section has adhesive on the upper or outer surface and the other section has adhesive on the lower or inner surface whereby the sheet can be wrapped in tubular form to bring the adhesive layers together to hold the closure in tubular form while heat is applied and the closure shrunk down on an object.

The stiff end sections make the closure difficult to manipulate, especially in smaller diameter sizes, and tend to cause the closure to peel apart at the adhesive joint and inhibit the provision of a uniform seal along the adhesive joint. Closures of this construction have been made with one end section having an extension that is positioned inside the completed closure. However, this extended rigid section interferes with the application of the closure, even when the thickness of the extension is tapered.

SUMMARY OF THE INVENTION

Broadly stated the present invention, to be described in greater detail below, is directed to a wrap around heat shrinkable closure made up of a rectangular sheet of heat shrinkable polymer having a large central section which has been hot stretched and cooled while in stretched condition bordered on one end by a small flat unstretched end section and on the other end by a large unstretched end section and with the large end section having at least one groove aligned with the free end of the sheet.

In accordance with a preferred embodiment of the present invention, the large unstretched end section has a first portion adjacent the central section and of an area substantially the same as the small end section and a second extension portion extending from the first portion to the free edge of the sheet and with a plurality of elongate grooves in the extension portion.

In accordance with still another aspect of the present invention, the extension portion of the large unstretched end section is tapered in thickness toward the free edge of the sheet. It has been found that the extension portion with grooves and particularly the tapered and grooved extension portion provides enhanced flexibility which permits ease of installation and an enhanced seal when a sealant is provided on the inside surface of the sheet.

The grooves can be formed in a number of different ways in accordance with this invention. When the groove is formed in such a way that upon application of heat to shrink the closure the groove will disappear, sealant is forced by the disappearing groove to the region along the edge of the adhesive bond between the end sections enhancing the seal of the closure.

These and other features and advantages of the present invention will become more apparent upon a perusal of the following specification taken in conjunction with the accompanying drawings wherein similar characters of reference refer to similar parts in each of the several views.

DESCRIPTION OF THE DRAWINGS

FIG. 1 is a plan view of a heat shrinkable closure sheet incorporating the present invention.

FIG. 2 is a cross sectional view of the structure shown in FIG. 1 taken along the line 2—2 in the direction of the arrows.

FIG. 3 is an enlarged view of a portion of the structure shown in FIG. 2 delineated by line 3—3 and showing in a phantom an extension that is not tapered.

FIG. 4 is an end elevational view illustrating a closure of the present invention assembled for heat shrinking.

FIG. 5 is an enlarged elevational sectional view showing parts of the assembled closure of FIG. 4 after application of heat to shrink the closure.

FIG. 6 is a schematic cross sectional view of jaws used to make the grooves in the end section.

FIG. 7 is a graph plotting weight in grams applied to the end of a closure end section extension verses the distance of displacement in millimeters.

DESCRIPTION OF THE PREFERRED EMBODIMENT

Figure 8:
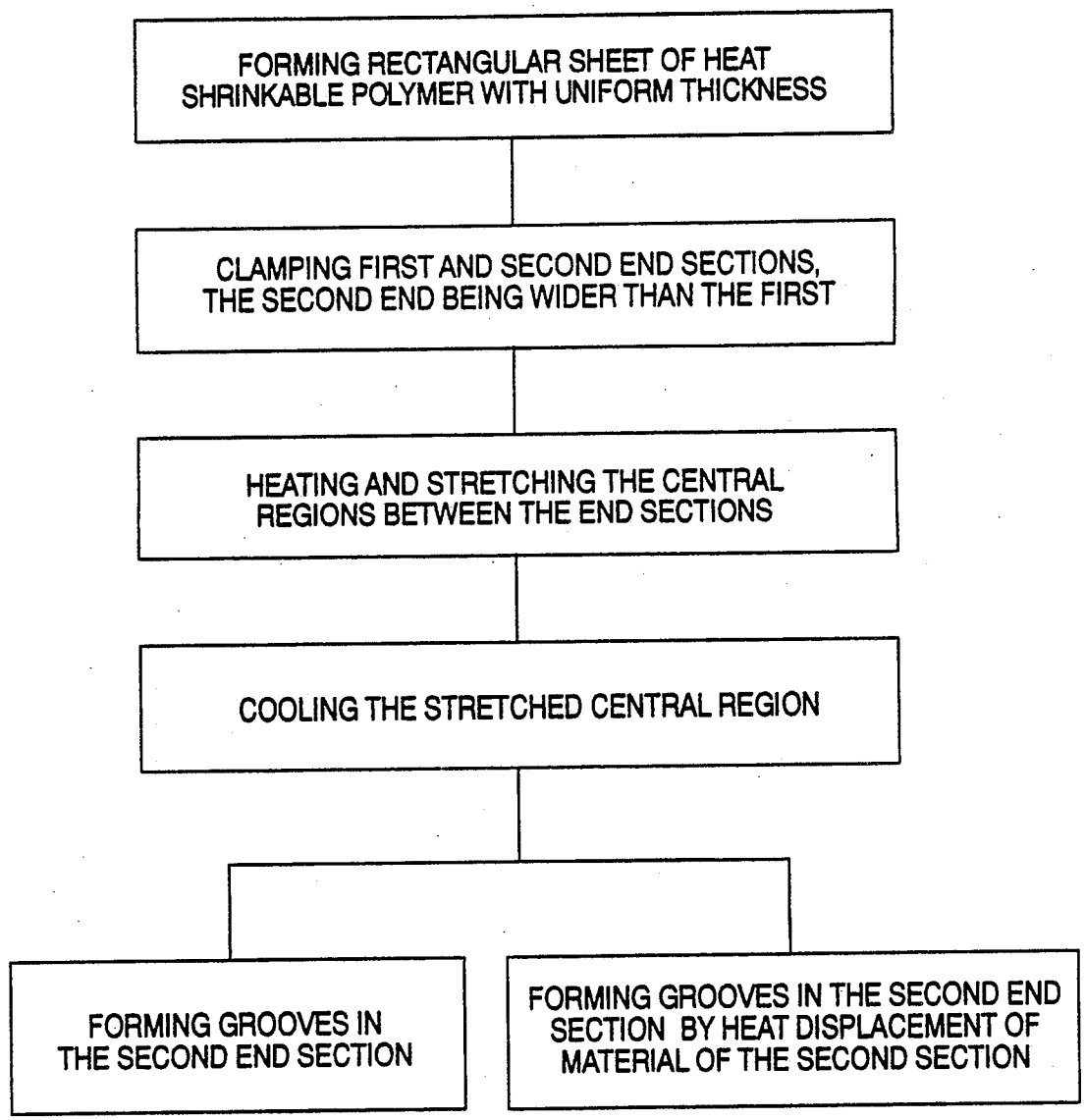
FIG. 8 is a block step diagram illustrating the preferred method in accordance with the present invention.

Referring now to the drawing, particularly with reference to FIGS. 1 and 2, there is illustrated a plastic sheet 8 in accordance with the present invention having an outside or upper surface 8a and an inside or lower surface 8b and made up of a large central section 9 which has been hot stretched and cooled while in stretched condition. The central section 9 is bordered at one end by an integral first small flat unstretched end section 11 and at the other end by an integral second large flat unstretched end section 21.

The plastic sheet 8 shown in FIGS. 1 and 2 which makes up the wrap around heat shrinkable closure can be prepared by molding or extruding a flat sheet of polyvinyl plastic material which is then cross-linked either by chemical means or by radiation. The molded or extruded sheet is then heated above the melting point of the crystalline portion of the cross-linked plastic material, and while at elevated temperature, the two opposite end edges of the sheet are clamped and the material between the clamped edges is stretched and cooled below the crystalline melting point of the material while it is still in expanded condition. In the resulting sheet 8 central section 9 is heat shrinkable or heat recoverable and the two end sections 11 and 21 do not shrink when heated. When it is desired to put the sheet into tubular form, the sheet is shaped into tubular form after hot stretching and before the central section has been cooled to ambient temperature. In order to ensure that the two flat end sections do not become involved in the stretching process, it may be desirable to cool the clamps that hold these end sections during the hot stretching process.

A sheet generally similar to that shown in FIG. 1 can be prepared by extruding a plastic tube, hot stretching the tube until its circumference is about one and one-half to four times the circumference of the original tube, slitting the tube from end to end, opening the slit tube to form a rectangular sheet, and then heating a narrow section of the plastic on each end of the slit to shrink those narrow sections to prestretched dimensions. The result is a sheet in which the narrow sections which have been shrunk to prestretched dimensions constitute the tabs or end sections 11 and 12 which are not heat shrinkable.

The plastic material from which the sheet 8 can be formed can be any plastic material having the property of being stretchable to about 1 ½ to 4 times its original dimension when heated above the melting points of its crystalline portion and then, if it is cooled while in stretched condition, having the property of returning to its original dimension when heated above the melting point of its crystalline portion.

The preferred plastic materials are cross-linked vinyl polymers such as high density polyethylene, low density polyethylene, ethylene-vinyl acetate copolymers, ethylene-alkyl acrylate copolymers, chlorinated polyethylene, chlorosulfonated polyethylene, ethylenepropylene copolymers or mixtures of polyethylene with any of the modified polyethylenes. The cross-linking can be accomplished either by chemical treatment with peroxides such as dicumyl peroxide, 2,5 bis(t-butyl peroxide)-2,5 dimethyl hexane, aa'-bis(t-butyl peroxy) di-isopropyl benzene and the like or by subjecting the polymers to intense radiation.

As shown in FIG. 2, an adhesive layer 12 is provided over substantially all or over a given area of the inside surface of the first, small unstretched end section 11. Similarly, an adhesive layer 22 of substantially the same area as the area of adhesive layer 12 is provided on the outside surface of a first portion 24 of end section 21 immediately adjacent the central section 9. The adhesive layers 12 and 22 can be made up of the materials described in U.S. Pat. No. 4,153,747. For example, layers 12 and 22 can consist of a first non-silicone adhesive layer, a second non-porous non-adhesive layer, and a third silicone adhesive layer. The adhesive layers 12 and 22 can then be provided with adherent cover layers illustrated as 13 and 23, respectively. The use of the non-porous non-adhesive layer is optional; it may be omitted and the silicone adhesive layer may be laid down on the surface of the non-silicone adhesive layer. Examples of the particular layers making up the adhesive layers 12 and 22 are given in U.S. Pat. No. 4,153,747.

The second large unstretched end section 21 has an extension portion or flap 25 extending from the first portion 24 covered by the adhesive 22 to the adjacent, elongate free edge 21' of the rectangular sheet 8. This extension 25 includes a plurality of grooves shown as 26, 27 and 28 aligned parallel with the free edge 21'. In the preferred embodiment illustrated in FIG. 2, the thickness of this extension 25 is tapered from a thickest dimension at the edge of the adhesive covered portion 24 to a thinnest dimension at the free edge 21'. Alternatively, an extension portion 25' of the end section 21 can be formed, as shown in phantom, without the taper, but the untapered grooved extension portion 25' is far less flexible than the tapered grooved extension portion.

The grooves 26, 27 and 28 can be formed in a number of different ways. FIG. 6 illustrates a cross-sectional view of a pair of jaws A and B used to make the grooved flap or extension. The grooves can be formed by impressing hot material of the extension 25 with a ribbed cold jaw A which will also cool the hot material. Alternatively, the grooves can be formed by impressing cold material with a hot ribbed jaw A and then cooling the material. Also, the grooves can be formed by stretching the hot material of the extension at various intervals and then cooling the extension. It is also possible to form the grooves by cutting and removing material from the extension 24. In the situation where the rectangular sheet is formed by extrusion, the grooves can be formed during extrusion of the rectangular sheet 8.

The inside surface 8b of the sheet 8 which is to be in contact with the material to be enclosed is preferably covered with a layer of hot melt sealant 10 which will melt and flow upon application of sufficient heat to shrink the rectangular sheet 8 and for the purpose of bringing the heat shrunk plastic sheet into close and continuous engagement with the article to be covered. Suitable sealants are well known in the art and include materials such as vinyl acetate polymer, wax, polyisobutenes, polyamides and the like.

FIGS. 4 and 5 illustrate the manner of use and application of the closure in accordance with this present invention. In FIG. 4, the adherent cover layers 13 and 23 have been removed from the adhesive layers 12 and 22, respectively, and the rectangular sheet wrapped around the article to be enclosed. The adhesive layer 12 of the first unstretched end section 11 is placed in adherent contact with the adhesive layer 22 on the large unstretched end section 21 and the end sections are pressed together. Heat is then applied to the article and the large central hot stretched section 9 shrinks or recovers and forces the softened or melted layer of sealant 10 into contact and into the interstices of the outside surface of the article being enclosed.

It has been discovered that the recovery of the grooves formed by hot pressing tends to displace or redistribute the sealant on the juxtaposed inside surface of the closure as shown in FIG. 5. The redistributed sealant is forced along the edge of the joint between the two adhesive layers 12 and 22 to provide the main seal along the length of the closure.

The grooves greatly improve the flexibility of the extended flap enabling ease of installation, most apparent with the smallest diameter sleeves. Also, better adhesion is achieved between the end sections of sheet 8.

The depth of the grooves is preferably at least half the thickness of the extension 25 at which the groove is located. The grooves are preferably spaced equal distances apart.

A preferred method in accordance with the following example is illustrated in FIG. 8.

EXAMPLE

A mixture of fifty parts low density polyethylene and fifty parts of chlorosufinated polyethylene was compounded with carbon black, stablizers and catalysts (1.5%), 2,5bis(t-butyl peroxide) 2,5dimethylhexane. A slab was molded from this material with a portion 1.25 inch in length along one free edge tapered from 0.14 inch thick to 0.03 inch thick. The molded slab was cured at 330° F. for five minutes and removed from the mold. The slab measured 4×5 inches and was 0.14 inch thick except for the tapered portion. One end of the slab was clamped 0.75 inch in from the edge and the opposite end of the slab was clamped 2.50 inch in from the opposite edge. The central section was heated to approximately 300° F. and stretched to a length of 15 inches and then cooled in expanded condition. The regions for application of the adhesive were then coated with a thin layer of lower alkyl cyanoacrylate adhesive (LOCTITE 414). Strips of material having dimensions corresponding to the coated surfaces of the end sections and consisting of a polyimid film substrate, a layer of silicon adhesive (diphenyl dimethyl siloxane polymer) and a strip of paper having an adherent coating on its lower surface were pressed down on the cyanoacrylate adhesive so the polyimid film was in contact with the cyanoacrylate. The inside or bottom surface of the hot stretched central section was coated with a layer of ethyl vinyl acetate polymer to function as a hot melt sealant. The larger or extension end of the sheet heated to 300° F. was pressed in a pair of cold jaws similar to those shown in FIG. 6 to form three parallel grooves spaced apart by 0.25 inches so that the thickness of the extension at the bottom of the respective grooves was 0.030, 0.035, and 0.044 inches, respectively, beginning with the deepest and most inward groove. The sheet was then wrapped around an inch cable with the hot sealant surface in contact with the cable. The adherent cover layers were peeled from the silicon adhesive on each end strip and the two layers of silicon adhesive were pressed together and adhesively joined. A gas fired propane torch was then applied uniformly to the entire surface of the wrap around closure which was now in tubular form bringing the temperature of the wrap around sheet to a level above about 300° F. and the heating was continued until the closure shrunk into firm contact with the cable. The assembly was sectioned and a small cross section taken of the closure at the region of the extension. The section showed that the grooves had recovered by approximately 60% from their original depth and a sealant forced into the region along the adhesive contact between the original ends of the sheet.

The flexibility of the extension 25 of a closure prepared generally in accordance with the foregoing example was tested. The extension was held horizontal and rigid by grasping the portion 24 of the large unstretched end section 21. Evaluation of the flexibility was determined by placing different weights on the end of the extension 25 and measuring the resulting horizontal deflection of the extension 25. The following table show the comparison made by using an untapered flap, a tapered flap without grooves and a grooved and tapered flap.

TABLE I

DEFLECTION IN MILLIMETERS OF FLAP AT DIFFERENT LOADS

| Form of Extension | 50 gm Weight | 150 gm Weight |
|---|---|---|
| Untapered | 0.4 mm | 0.9 mm |
| Tapered | 0.9 mm | 1.7 mm |
| Grooved and Untapered | 0.5 mm | 1.0 mm |
| Grooved and Tapered | 2.6 mm | 3.5 mm |

The values of Table I are presented in the graph as FIG. 7 of the drawing.

A flexibility tester as described in ASTM Method D-747 was used to measure the flexibility of the flap. The following table gives the load scale readings using a 2 inch sample, 15 degrees angular deflection and a 4 inch pound moment. Lower values signify greater flexibility.

TABLE II

| Form of Extension | Load Scale Readings |
|---|---|
| Untapered | 41.7 |
| Tapered | 35.8 |
| Grooved and Untapered | 38.5 |
| Grooved and Tapered | 17.3 |

The terms and expressions which have been employed here are used as terms of description and not of limitations, and there is no intention, in the use of such terms and expressions, of excluding equivalents of the features shown and described, or portions thereof, it being recognized that various modifications are possible with the scope of the invention claimed.

I claim:
1. The method of forming a wrap around closure comprising:
   forming a generally rectangular sheet of heat shrinkable polymer with substantially uniform thickness,
   clamping along opposite edges of said sheet a first end section and a second end section with said second section being wider than said first end section.
   heating and stretching the region of said sheet between said end sections and cooling said region in stretched condition, and
   forming grooves in said second end section.
2. The method of claim 1, including forming said grooves by heat displacement of material of said second end section whereby said grooves will at least partially recover upon application of heat to said closure sufficient to at least partially recover said stretched region.

* * * * *